United States Patent
Murata et al.

(10) Patent No.: US 8,663,569 B2
(45) Date of Patent: Mar. 4, 2014

(54) OZONE GENERATING APPARATUS

(75) Inventors: Takaaki Murata, Kawasaki (JP);
Kiyoyuki Amemori, Tokyo (JP);
Ryutaro Makise, Yokohama (JP);
Kanako Nakajima, Yokohama (JP);
Kazuhiko Noda, Hino (JP); Michiko Hashimoto, Atsugi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/331,908

(22) Filed: Dec. 20, 2011

(65) Prior Publication Data
US 2012/0156106 A1    Jun. 21, 2012

(30) Foreign Application Priority Data

Dec. 21, 2010    (JP) ................. 2010-284495

(51) Int. Cl.
*B01J 19/08*    (2006.01)
(52) U.S. Cl.
USPC ................. 422/186; 422/186.04; 422/186.07; 422/186.11; 422/186.2; 422/907; 204/176; 204/164; 204/242; 204/247
(58) Field of Classification Search
USPC ................. 422/186, 186.04, 186.07, 186.11, 422/186.2; 204/164, 176, 242, 247
See application file for complete search history.

(56) References Cited

U.S. PATENT DOCUMENTS

| | | | | |
|---|---|---|---|---|
| 2009/0236042 | A1* | 9/2009 | Wada et al. | 156/345.43 |
| 2010/0296980 | A1* | 11/2010 | Nakatani et al. | 422/186.07 |
| 2010/0296981 | A1* | 11/2010 | Takauchi et al. | 422/186.11 |
| 2011/0280774 | A1 | 11/2011 | Fujita et al. | |

FOREIGN PATENT DOCUMENTS

| | | |
|---|---|---|
| CA | 2699768 | 11/2010 |
| CN | 2406988 Y | 11/2000 |
| CN | 101891156 A | 11/2010 |
| JP | 10-182109 | 7/1998 |
| JP | 2007-169134 | 7/2007 |
| JP | 2008-13404 A | 1/2008 |
| WO | WO 2010/137153 A1 | 12/2010 |

OTHER PUBLICATIONS

Office Action dated Nov. 19, 2012, issued by the Canadian Patent Office in corresponding Canadian Pat. App. No. 2,764,215.
Notification of the First Office Action mailed Oct. 17, 2013, in corresponding Chinese Patent Application No. 201110432342.7

* cited by examiner

*Primary Examiner* — Xiuyu Tai
(74) *Attorney, Agent, or Firm* — Finnegan, Henderson, Farabow, Garrett & Dunner, LLP (57) ABSTRACT

An ozone generating apparatus according to one embodiment includes a hollow cylindrical sealed container provided with an inlet for a feed gas containing oxygen gas and an outlet for an ozonized gas. A discharge tube including a dielectric tube arranged within the container and a first electrode arranged within the dielectric tube is provided in the container. A second electrode is arranged within the container and surrounds the first electrode, spaced apart from the dielectric tube to form a discharge gap between the second electrode and the dielectric tube. The apparatus further includes a discharge voltage source configured to apply a discharging voltage across the first and second electrodes, and a cooling water jacket surrounding the second electrode. The dielectric tube has an outer diameter of 12 mm or more, but 19 mm or less.

6 Claims, 6 Drawing Sheets

OZONE GENERATING APPARATUS

CROSS-REFERENCE TO RELATED APPLICATIONS

This application is based upon and claims the benefit of priority from prior Japanese Patent Application No. 2010-284495, filed Dec. 21, 2010, the entire contents of which are incorporated herein by reference.

FIELD

Embodiments described herein relate generally to an ozone generating apparatus.

BACKGROUND

In general, an ozone generating apparatus comprises a dielectric tube made of a dielectric such as glass. On the inner surface of the dielectric tube, an electrically conductive film as a first electrode is formed and constitutes a dielectric electrode together with the dielectric tube. Outside the dielectric tube, a second, hollow cylindrical electrode is provided, surrounding the first electrode. Spacers are inserted between the dielectric tube and the second electrode, forming a small discharge gap. A silent discharge is generated in the discharge gap by allowing a feed gas containing oxygen gas to flow through the discharge gap, while applying a high voltage across the first and second electrodes. The oxygen contained in the feed gas is ozonized by the silent discharge, producing an ozonized gas.

In the ozone generating apparatus described above, high ozone generating efficiency may be achieved by shortening the distance between the dielectric tube and the second electrode (discharge gap length). However, if the discharge gap length is made too short, it becomes difficult to uniformly maintain the discharge gap, failing to achieve uniform discharge. Therefore, in the conventional ozone generating apparatus, the discharge gap length has been set at 0.6 mm to 1 mm.

DETAILED DESCRIPTION

An ozone generating apparatus according to one embodiment generates an ozonized gas from a feed gas containing oxygen. The ozone generating apparatus comprises: a hollow cylindrical sealed container provided with an inlet for the feed gas and an outlet for the ozonized gas; a discharge tube including a dielectric tube arranged within the container and a first electrode arranged within the dielectric tube; a second electrode arranged within the container and surrounding the first electrode, spaced apart from the dielectric tube to form a discharge gap between the second electrode and the dielectric tube; a discharge voltage source configured to apply a discharging voltage across the first and second electrodes; and a cooling water jacket surrounding the second electrode. The dielectric tube has an outer diameter of 12 mm or more, but 19 mm or less.

If the outer diameter of the dielectric tube is outside the range of 12 mm to 19 mm, then a sufficient discharge area can not be secured and at the same time the outer diameter of the dielectric tube can not be maintained with accuracy.

The ozone generating apparatus described above ozonizes the feed gas containing oxygen by applying AC high voltage across the first and second electrodes conventionally, thereby generating discharge plasma. Moreover, the feed gas may be ozonized by applying a pulsed high voltage with the pulse width of 1 millisecond or less, particularly 10 microsecond or less. The pulsed voltage operation is suitable for high ozone generation efficiency because the ion loss can be decreased.

In the ozone generating apparatus described above, the discharge gap length formed between the dielectric tube and the second electrode is preferably 0.15 mm or more, but 0.3 mm or less. If the discharge length is less than 0.15 mm, then the pressure drop of the gas within the dielectric tube may become large, and thus a sufficient amount of the gas may not be allowed to flow through the discharge gap, lowering the ozone generation efficiency. On the other hand, if the discharge gas length exceeds 0.3 mm, the ozone generation efficiency may be lowered.

In the ozone generating apparatus described above, the discharge gap may be secured by spacers. The spacer may be provided by a separate entity from the dielectric tube and the second electrode. In another embodiment, the spacer may be constituted by a projection integrally formed on the outer peripheral surface of the dielectric tube. In still another embodiment, the spacer may be provided by a projection integrally formed on that surface of the second electrode which faces the dielectric tube.

In the ozone generating apparatus described above, the first electrode may be formed on the inner surface of the dielectric tube, and the ozone generating apparatus may further comprise a high voltage feed contact in the form of a rod with a circular cross-section, and a stainless steel wool material provided between the first electrode and the feed contact in direct contact with both. A slit may be formed in the feed contact along the axial direction of the feed contact, and a portion of the stainless steel wool material may be inserted in the slit, and the remaining portion of the stainless steel wool material may wrap the peripheral surface of the feed contact. With this simple construction, a high frequency voltage may be applied stably to the first electrode, producing ozone with high efficiency.

In one embodiment, the dielectric tube and the second electrode constitute an ozone generation device, and a plurality of such ozone generation devices may be arranged within the container described above.

Next, some embodiments will be described with reference to the drawings. Throughout the drawings, the same or similar elements are denoted by the same reference symbols or numerals.

Figure 1:
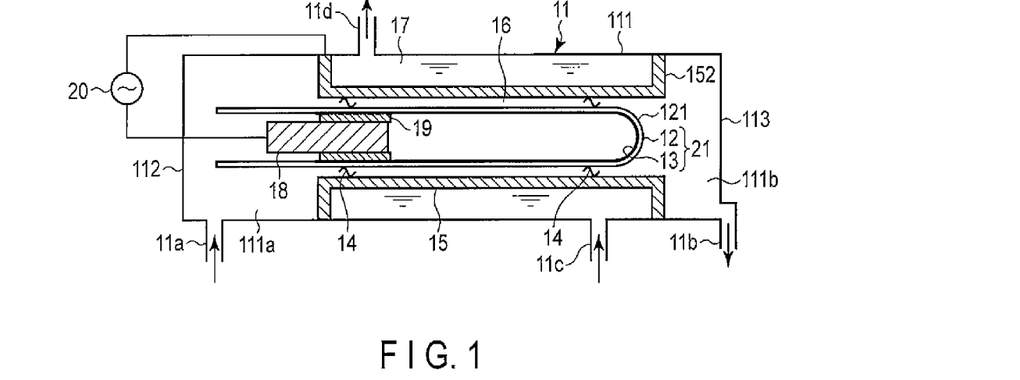
FIG. 1 illustrates a schematic cross-sectional view of an ozone generating apparatus according to a first embodiment.

FIG. 1 illustrates a schematic cross-sectional view of an ozone generating apparatus 10 according to a first embodiment.

The ozone generating apparatus 10 produces an ozonized gas from a feed gas containing oxygen (e.g., dry air, oxygen gas, etc.), and comprises a sealed container 11 made of e.g., stainless steel. The container 11 has a hollow cylindrical body 111, and its both ends are closed by end plates 112 and 113, respectively.

Within the container 11, a hollow cylindrical dielectric tube 12 made of glass, whose one end 121 is closed, is provided coaxially with the container 11. The dielectric tube 12 may have a thickness of 1 mm to 3 mm. In the conventional ozone generating apparatus, a glass-made dielectric tube having an outer diameter of 76 mm has been used. A first electrode 13 made of a metal such as nickel or stainless steel is formed on the inner surface of the dielectric tube 12. The first electrode 13 constitutes a dielectric electrode together with the dielectric tube 12. The dielectric tube having the first electrode 13 is referred to as discharge tube 21.

Outside the dielectric tube 12, a hollow cylindrical, second electrode 15 is arranged, surrounding the first electrode through a plurality of spacers 14 coaxially with the container 11. A discharge gap 16 is formed between the dielectric tube 12 and the second electrode 15 by the spacers 14. The second electrode 15 has flanges 151 and 152 at its ends, forming a cooling water jacket 17 between it and the container 11.

Within the dielectric tube 12, a high voltage feed contact in the form of a rod with a circular cross-section arranged coaxially with the dielectric tube 12. A stainless steel wool material 19 is provided between the first electrode and the feed contact in direct contact with both. The feed contact 18 and the second electrode 12 are electrically connected to a power supply (high voltage generator) 20. The first electrode 13 is electrically connected to the power supply 20 through the feed contact 18 and the stainless steel wool material 19.

In operation, a feed gas containing oxygen is introduced in to the container 11 through the gas inlet 11a, and a pulsed high voltage (1 millisecond or less, particularly 10 microsecond or less per pulse) is applied across the first and second electrodes 13 and 14 to generate silent discharge in the discharge gap 16, thereby ozonizing the feed gas passing through the discharge gap 16. The ozonized gas is discharged from the container through the gas outlet 11b provided on the container 11. During the operation, cooling water is introduced into the jacket 17, cooling the second electrode 15. The cooling water is discharged through a cooling water outlet 11d provided on the container 11. The discharge tube 21 constituted by the dielectric tube 12 and the first electrode 13 defines an ozone generation device together with the hollow cylindrical second electrode 15 provided spaced apart from the dielectric tube 12 so as to form the discharge gap 16. Further, the flanges 151 and 152 act as partition walls which compart the interior of the container 11, defining a feed gas chamber 11a constituted by the end area of the container at the side of the gas inlet 11a, and an ozonized gas chamber 111b constituted by the end area of the container at the side of the gas outlet 11b.

Figure 2:
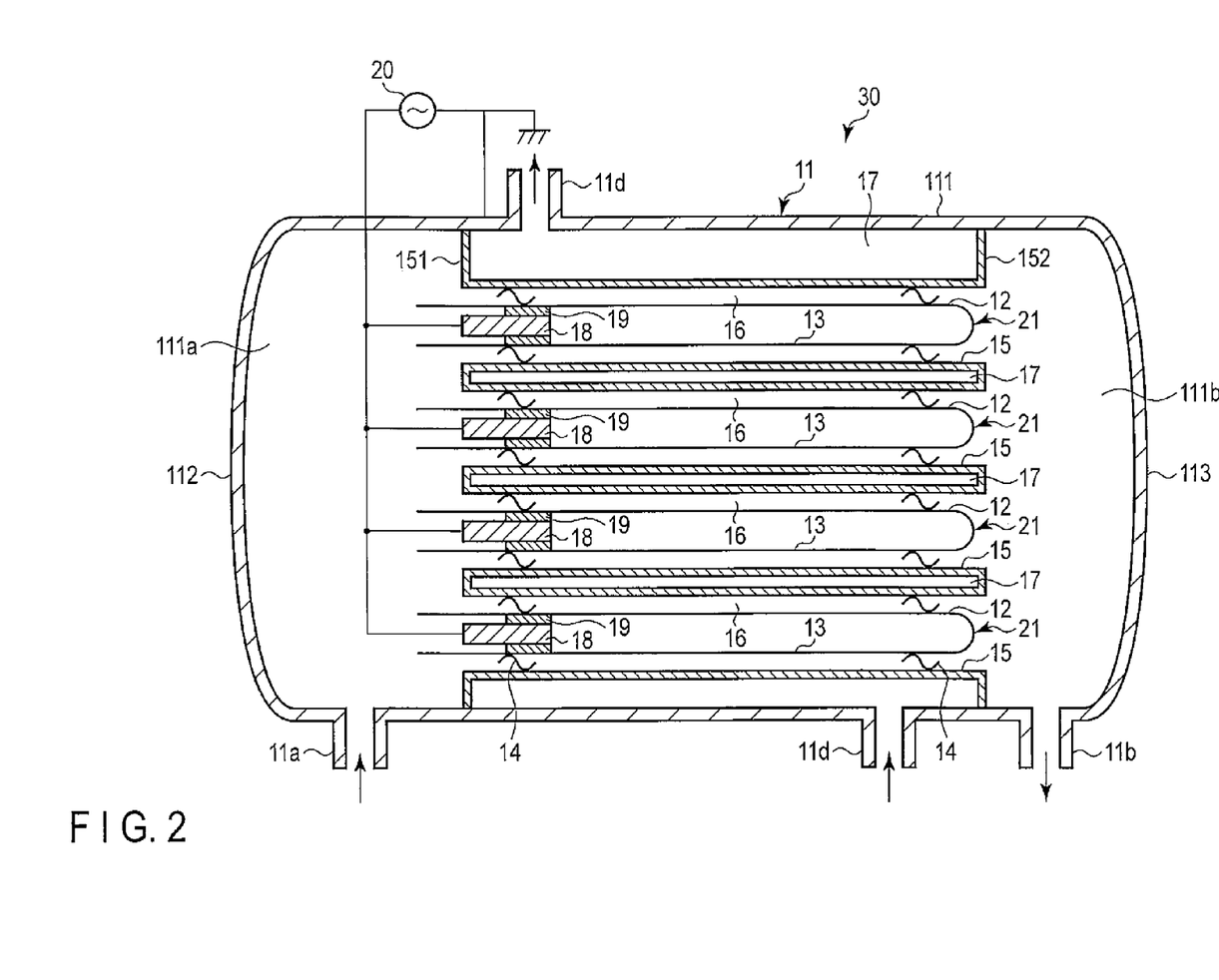
FIG. 2 illustrates a schematic cross-sectional view of an ozone generating apparatus according to a second embodiment.

FIG. 2 illustrates a schematic cross-sectional view of an ozone generating apparatus 30 according to a second embodiment.

The ozone generating apparatus 30 comprises a plurality of the ozone generation devices. Each of the ozone generation device is constituted by the discharge tube 21 including the dielectric tube 12 and the first electrode 13, and the hollow cylindrical second electrode 15 provided spaced apart from the discharge tube so as to form the discharge gap 16, as explained with reference to FIG. 1. The ozone generating devices extend over between the partition walls 151 and 152 parallel to each other.

Figure 3:
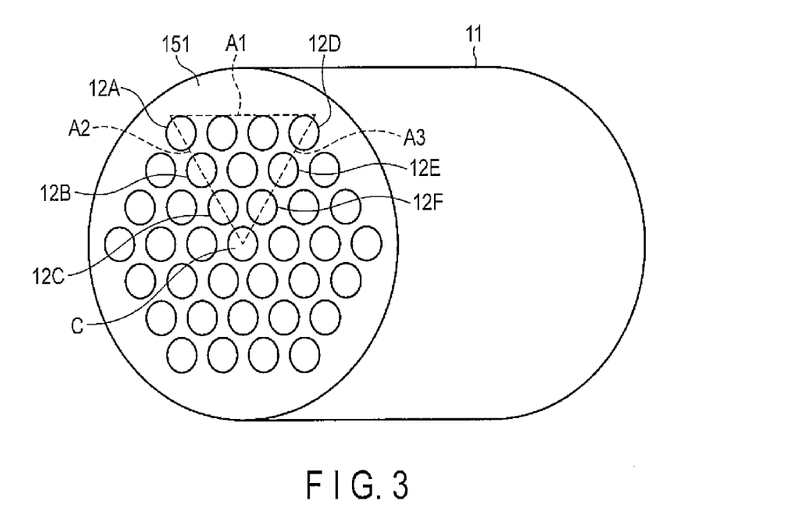
FIG. 3 is a view for explaining advantageous effects of the ozone generating device.

FIG. 3 is a view for explaining advantageous effects of the ozone generating device according to the second embodiment. In FIG. 3, only the container 11 and the dielectric tubes 12 are illustrated for simplicity. A plurality of dielectric tubes 12 are accommodated compactly within a regular hexagonal region in the partition wall 151, for example. The total number of the dielectric tubes 12 can be obtained as follows.

The total number of the dielectric tube 12, N, can be calculated by the following equation:

$$N=6q+1$$

where q denotes the number of the dielectric tube 12 accommodated within a regular triangle (indicated by broken line in FIG. 3) defined by one edge B of the regular hexagon and the center C of the regular hexagon, excluding the tube 12 positioned at the center C. Here, it should be noted that three tubes 12A, 12B and 12C are each divided in half by an edge A2 of the triangle and the half is counted as 0.5. Likewise, three tubes 12D, 12E and 12F are each divided in half by an edge A3 of the triangle and the half is counted as 0.5. Thus, in the example shown in FIG. 3, q is 6, and N is 37.

The number of q is calculated by the following equation:

$$Q=p(p-1)/2$$

where p denotes the number of the rows (stages) of dielectric tubes 12 counting from the center stage and including the center stage.

Thus, the total number of the dielectric tubes, N, can be calculated from:

$$N=3p(p-1)+1$$

It should be noted that the number of dielectric tube stages, p, in the example shown in FIG. 3 is four.

Figure 4:
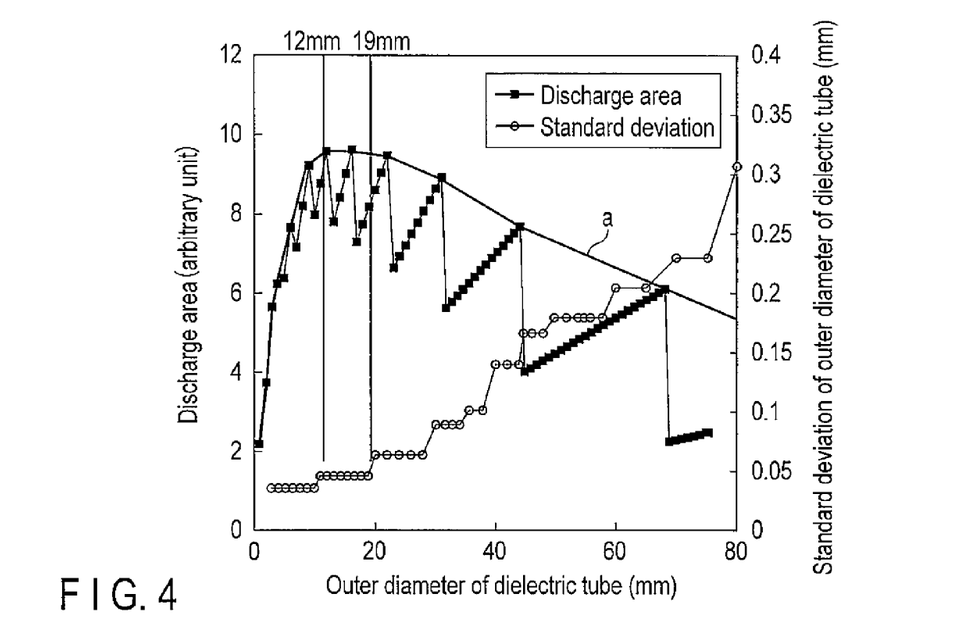
FIG. 4 illustrates a relationship between an outer diameter of a dielectric tube and a discharge area.

FIG. 4 illustrates a relationship between an outer diameter of a dielectric tube and a discharge area. As illustrated in FIG. 4, as the outer diameter of the dielectric tube is made smaller, the discharge area abruptly increases at some points. At these points, the number of the dielectric tube stages increases by one within the container. If the inner diameter of the container is changed, the points noted above are somewhat shifted. From the curve a, which connects the above points, it can be seen that the discharge area saturatedly becomes maximum at the dielectric tube outer diameter within the range of 22 mm to 12 mm.

The standard deviation of the outer diameter of the dielectric tube is indicated also in FIG. 4. The standard deviation becomes smaller as the outer diameter of the dielectric tube is smaller, which indicates higher accuracy of the outer diameter. However, it can be seen that the standard deviation changes stepwise, and does not change within a certain outer diameter range. Within the dielectric tube outer diameter range of 22 mm to 12 mm, the standard deviation abruptly becomes small at the point at which the outer diameter changes from 20 mm to 19 mm. Therefore, the dielectric tube diameter range, within which a sufficient discharge area can be obtained and at the same time the accuracy of the outer diameter of the dielectric tube is maintained, is 12 mm or more, but 19 mm or less.

By setting the outer diameter of the dielectric tube at 12 mm or more, but 19 mm or less, the outer diameter of the dielectric tube can be made accurate, the discharge becomes uniform, and at the same time a sufficient discharge area can be obtained regardless of the total number of the dielectric tubes (or discharge tubes) accommodated in the container, and therefore discharge power density can be made small, and the increase in the gas in the container can be suppressed, resulting in that the thermal decomposition of ozone can be suppressed, and ozone can be generated with high efficiency.

Figure 5:
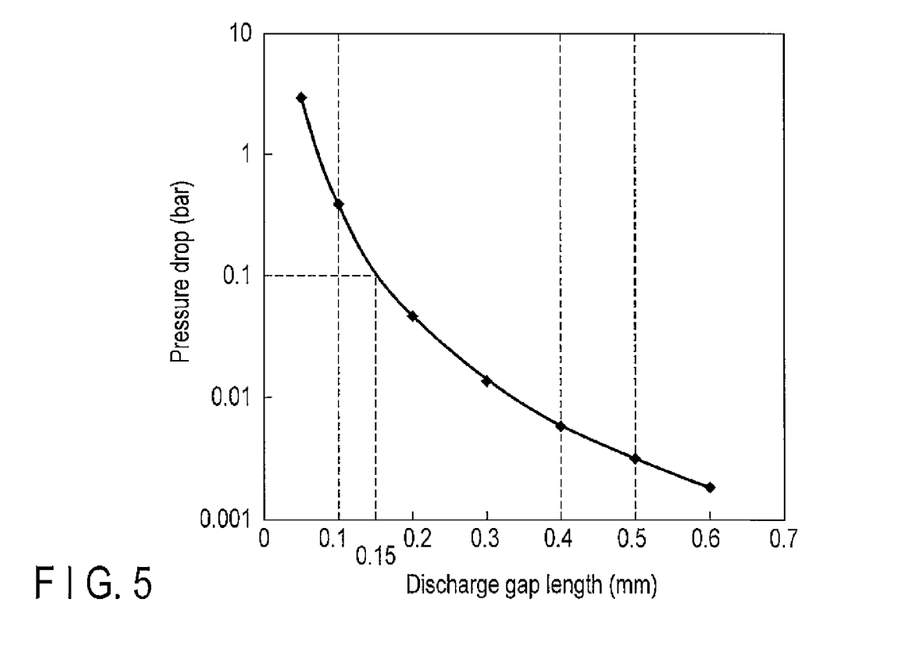
FIG. 5 illustrates a relationship between a discharge gag length and a gas pressure drop.
Figure 6:
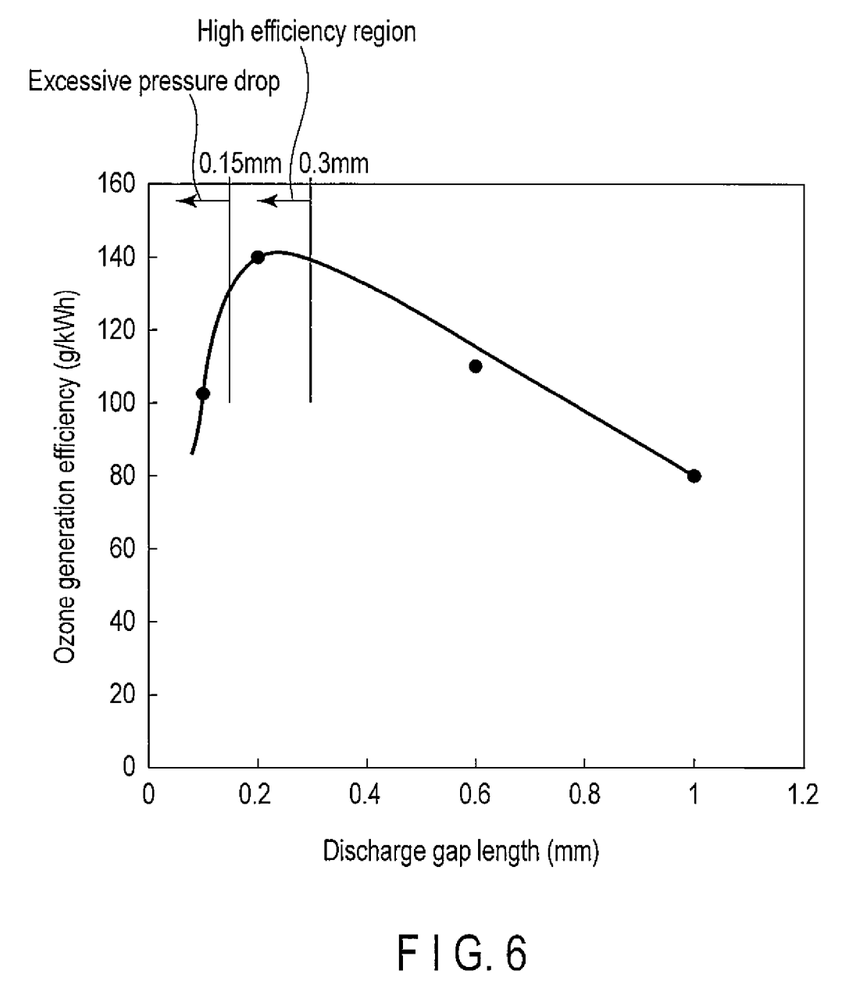
FIG. 6 illustrates a relationship between a discharge gap length and an ozone generation efficiency.

Further, if the discharge gap length is made smaller, ozone can be generated with high efficiency. However, when the discharge gap length is too small, the gas pressure drop between the inlet and the outlet of the discharge gap becomes large, making it difficult to flow a sufficient amount of the feed gas through the discharge gap, lowering the ozone generation efficiency. FIG. 5 shows a relationship between a discharge gap length and a gas pressure drop. It is apparent from FIG. 5 that the pressure drop increases as the discharge gap length is made smaller. Practically, the pressure drop should be 0.1 bar or less. Therefore, it can be seen from FIG. 5 that the discharge gap length should be 0.15 mm or more. Further, there is shown in FIG. 6 an ozone generation efficiency in the case where oxygen gas was introduced into the container 11 at a pressure of 0.2 MPa, and an ozonized gas having an ozone concentration of 150 g/Nm3 was produced. It is seen from FIG. 6 that the ozone generation efficiency is high when the discharge gap length is 0.3 mm or less, and that the optimum discharge gap length is 0.15 mm or more, but 0.3 mm or less when the pressure drop is taken into consideration.

As is apparent from the above, uniform discharge can be achieved with high accuracy even if the discharge gap length between the discharge tube 21 and the second electrode 15 is less than 0.6 mm.

Figure 7:
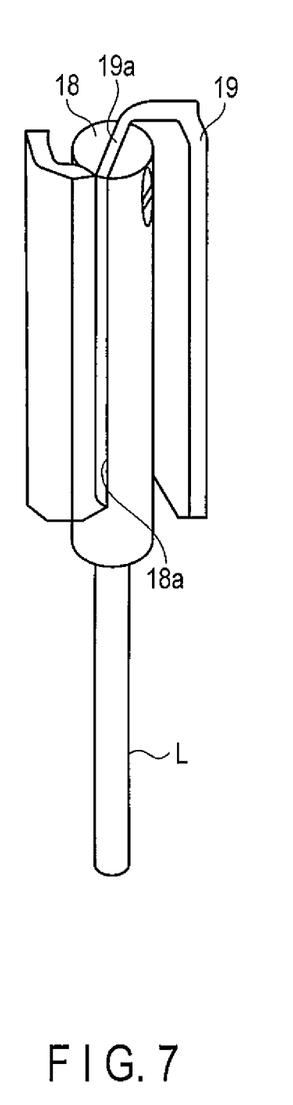
FIG. 7 illustrates structures of a high voltage feed contact and a stainless steel wool material.

FIG. 7 schematically illustrates the structures of the high voltage feed contact 18 and the stainless steel wool material 19 in the ozone generating apparatus according to the first or second embodiment.

A slit 18a is formed in the rod-shaped feed contact 18 along the axial direction of the contact 18. A portion of the stainless steel wool material 19 is inserted into the slit 18a, and the remaining portion of the stainless steel wool material 19 wraps the feed contact 18. A lead L is connected to one end of the feed contact 18 for connection to the voltage source 20 (see FIG. 1 or 2).

With such structures of the high voltage feed contact 18 and the stainless steel wool material 19, the voltage from the voltage source 20 (see FIG. 1 or 2) can be stably supplied to the first electrode 13 (see FIG. 1 or 2), resulting in that ozone can be generated with high efficiency.

Figure 8:
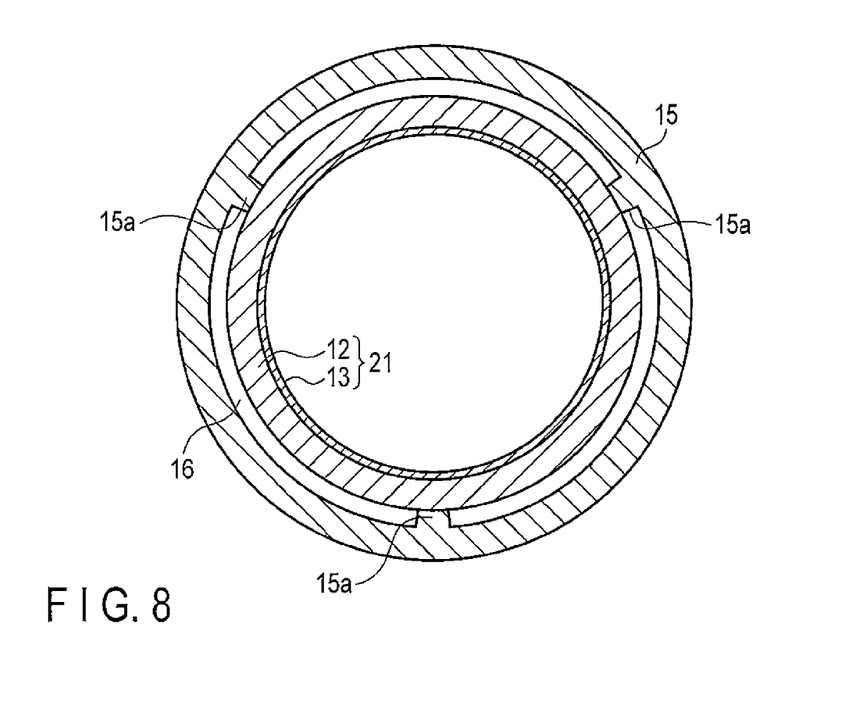
FIG. 8 illustrates a structure of an ozone generation device according to one embodiment.

FIG. 8 illustrates a cross-sectional view of an ozone generation device according to another embodiment which may be used in the ozone generating apparatus illustrated in FIG. 1 or FIG. 2.

As illustrated in FIG. 8, a plurality of projections 15a are formed integrally on the inner surface of the hollow cylindrical second electrode 15. The peripheral surface of the discharge tube 21 (more accurately, the dielectric tube 12) contacts with the projections 15a, forming a discharge gap 16 having a uniform gap length. In other words, the projections 15a act as spacers securing the discharge gap. It should be noted that the tip ends of all the projections 15a are not necessary to contact with the peripheral surface of the dielectric tube 12, and it suffices that some of the projections 15a contact the peripheral surface of the dielectric tube 12.

Figure 9:
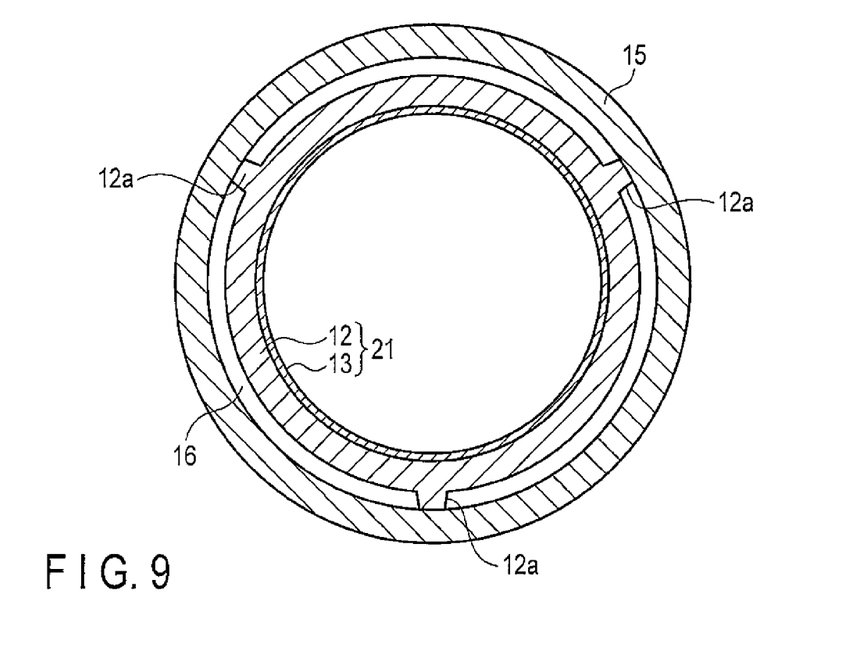
FIG. 9 illustrates a structure of an ozone generation device according to another embodiment.

FIG. 9 illustrates a cross-sectional view of an ozone generation device according to still another embodiment which may be used in the ozone generating apparatus illustrated in FIG. 1 or FIG. 2.

As illustrated in FIG. 9, a plurality of projections 12a are formed integrally on the peripheral surface of the hollow cylindrical dielectric tube 12. The inner surface of the hollow cylindrical second electrode 15 contacts with the projections 12a, forming a discharge gap 16 having a uniform gap length. In other words, the projections 12a act as spacers securing the discharge gap.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ozone generating apparatus which generates an ozonized gas from a feed gas containing oxygen, the apparatus comprising:
    a hollow cylindrical sealed container provided with an inlet for the feed gas and an outlet for the ozonized gas;
    a discharge tube including a dielectric tube arranged within the container and a first electrode arranged within the dielectric tube;
    a second electrode arranged within the container and surrounding the first electrode, spaced apart from the dielectric tube to form a discharge gap between the second electrode and the dielectric tube;
    a discharge voltage source configured to apply a discharging voltage across the first and second electrodes; and
    a cooling water jacket surrounding the second electrode,
    wherein the dielectric tube has an outer diameter of 12 mm or more, but 19 mm or less.

2. The apparatus according to claim 1, wherein a gap length of the discharge gap is 0.15 mm or more, but 0.3 mm or less.

3. The apparatus according to claim 1, wherein a projection is integrally formed on a peripheral surface of the dielectric tube, the projection securing the discharge gap.

4. The apparatus according to claim 1, wherein a projection is integrally formed on a surface of the second electrode which faces the discharge tube, the projection securing the discharge gap.

5. The apparatus according to claim 1, wherein the discharge tube and the second electrode constitute an ozone generation device, and a plurality of the ozone generation devices are arranged within the container.

6. The apparatus according to claim 5, further comprising partition walls,
    wherein the ozone generation devices extend over between the partition walls, and circular cross sections of ozone generation devices are arranged within a regular hexagonal region in the partition wail and a total number of the dielectric tubes are calculated from the following equation:

$$N=3p(p-1)+1,$$

where p denotes a number of stages of dielectric tubes counting from a center stage and including the center stage, and
    wherein a gap length of the discharge gap is 0.15 mm or more, but 0.3 mm or less.

* * * * *

UNITED STATES PATENT AND TRADEMARK OFFICE
CERTIFICATE OF CORRECTION

| | | |
|---|---|---|
| PATENT NO. | : 8,663,569 B2 | Page 1 of 1 |
| APPLICATION NO. | : 13/331908 | |
| DATED | : March 4, 2014 | |
| INVENTOR(S) | : Murata et al. | |

It is certified that error appears in the above-identified patent and that said Letters Patent is hereby corrected as shown below:

In the Claims

Claim 6, column 6, line 54, change "partition wail" to --partition wall--.

Signed and Sealed this
Seventeenth Day of June, 2014

Michelle K. Lee
*Deputy Director of the United States Patent and Trademark Office*